(No Model.)
F. D. LOOMIS & J. B. DUPONT.
INSECT DESTROYER.
No. 276,613. Patented May 1, 1883.
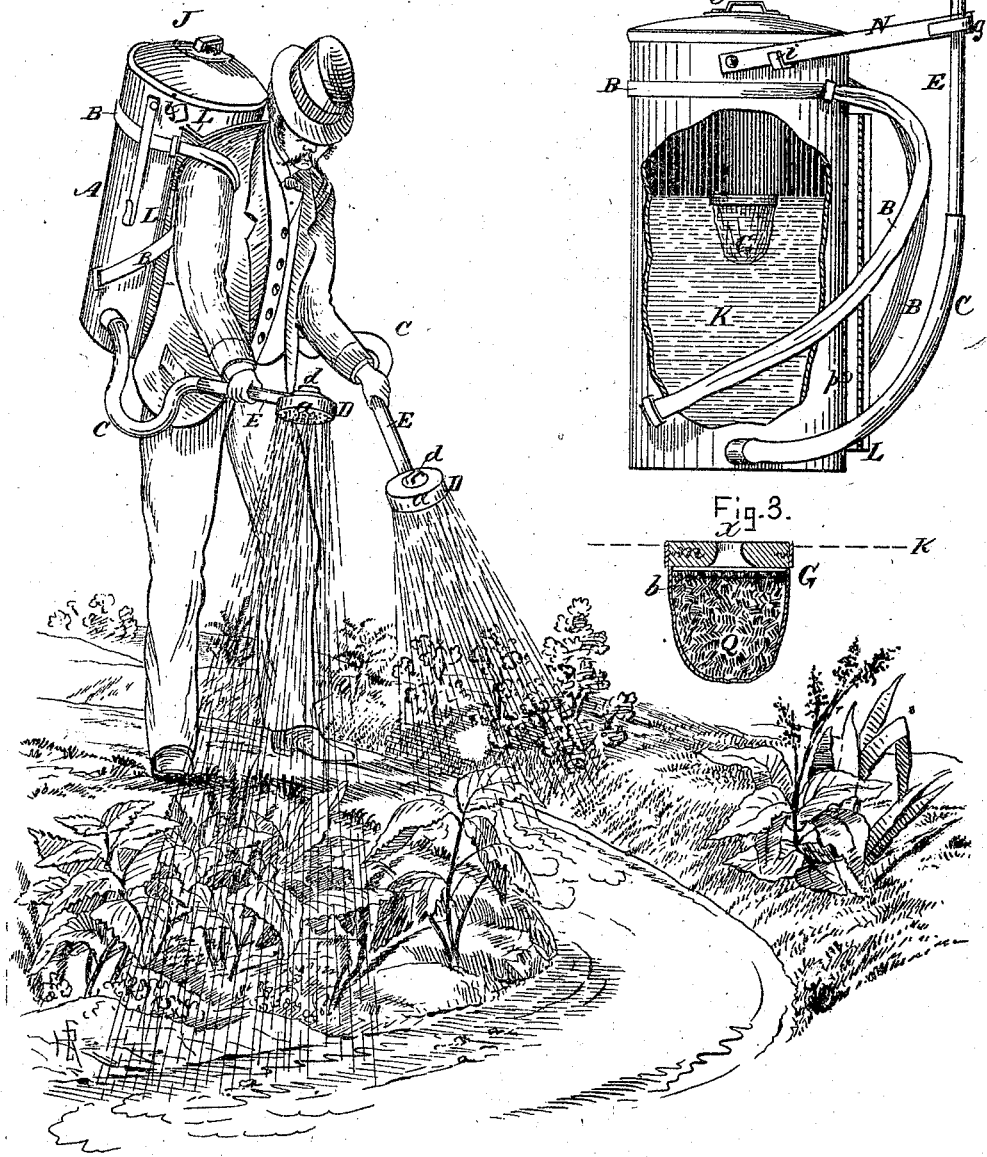

UNITED STATES PATENT OFFICE.

FRANCIS D. LOOMIS AND JOHN B. DUPONT, OF FRAMINGHAM, MASS.

INSECT-DESTROYER.

SPECIFICATION forming part of Letters Patent No. 276,613, dated May 1, 1883.

Application filed September 13, 1882. (No model.)

*To all whom it may concern:*

Be it known that we, FRANCIS D. LOOMIS and JOHN B. DUPONT, of Framingham, in the county of Middlesex, State of Massachusetts, have invented a certain new and useful Improvement in Insect-Destroyers, of which the following is a description sufficiently full, clear, and exact to enable any person skilled in the art or science to which said invention appertains to make and use the same, reference being had to the accompanying drawings, forming a part of this specification, in which—

Figure 1 is an isometrical perspective view, representing the device in use; Fig. 2, a side elevation, and Fig. 3 a vertical transverse section of the float detached.

Like letters of reference indicate corresponding parts in the different figures of the drawings.

Our invention relates to that class of insect-destroyers which are employed in killing or destroying insects on plants, vegetables, trees, &c.; and it consists in a novel construction and arrangement of the parts, as hereinafter more fully set forth and claimed.

In the drawings, A represents the reservoir or tank, and B the strap by which it is carried when in use, the strap being secured to the tank by any proper and convenient means, and rendered extensible or adjustable by buckles or similar appliances. Connected with the lower part of the reservoir there is a flexible tube, C, having at its outer end a sprinkler, D, provided with an elongated rigid handle, E, which is tubular in its construction and opens into the sprinkler-head $a$, to which it is attached at an angle of about thirty-three degrees, or so that when the sprinkler is in use its face or perforated side will be parallel, or nearly so, with the ground. The sprinkler-head is provided with a removable screw-cap, $d$, at the top of the same for the purpose of clearing it out when the holes become clogged, and each machine may be provided with two pipes and two sprinklers, if desired, as shown in Fig. 1.

The float represented in Fig. 3 consists of an annular disk of wood, $m$, having the central opening or pocket, $x$, and provided with a circular foraminous plate, $b$, secured to the lower face of the disk in such manner as to leave a small space between the plate and lower face of the disk.

A sack, H, composed of fine wire-netting, coarse cotton cloth, or other fibrous material, is attached to the disk $m$, and hangs suspended therefrom, being filled with sawdust, fine particles of cork, or any similar material, permanent in its character and of lighter specific gravity than water.

In the use of our improvement the tank or reservoir A is filled with water, and the float G inserted in the same through the opening J, which is provided with a proper cover. The pocket $x$ is then filled with paris-green or some other soluble poison, which passes under the disk $m$ and over the plate $b$, through which it is filtered into or through the particles of cork or sawdust Q in the sack H. The float is designed to be so constructed or weighted that when the pocket $x$ is filled with paris-green or the poison to be used, the top of the disk $m$ will be on a level or slightly below the water-line or level of the water in the tank, or so that the waves of water, caused by the movements of the tank, will break or wash into the pocket $x$, and, passing through the plate $b$ and filtering material Q carry the poison in solution through the sack H into the main body of water in the tank, and thus thoroughly impregnate the same. After the float is inserted in the tank and filled with poison, as described, the tank is mounted on the shoulders of the person using or operating the device, as shown in Fig. 1, being kept in position by passing the arms through the straps B. The handle E of the sprinkler D is then taken in the hand of the operator and the spray from the same directed onto the plants in a manner which will be readily understood without a more explicit description. There may be used, if desired, a curved guard or shield, L, attached to the tank A, so as to leave an air-space, $p$, between the tank and shield, as best seen in Fig. 2, whereby the tank is detached or kept removed from the body or back of the person carrying the same a sufficient distance to avoid the ill effects of the close contact of the tank with the body of the user.

When the device is not in use the sprinkler-heads may be elevated above the level of the water in the reservoir, and secured in position by means of the arm N, which is provided with a hook, g, on its outer or free end for that purpose, the arm resting in the bracket i, and when not in use, hanging by the side of the tank, as seen in Fig. 1.

It will be obvious that the paris-green or other soluble salt or poison used for impregnating the water in the reservoir, by being suspended in the float, as described, will be thoroughly dissolved and disseminated through the whole mass of water, which is not so thoroughly accomplished when the same is placed directly in the water without the intervention of the float.

Having thus described our invention, what we claim is—

1. A floating poison receptacle and distributer for insect-destroyers, consisting of a buoyant disk having an opening or mouth, a perforated diaphragm below the disk and a pendent bag attached to the disk, and containing absorbent material, substantially as described.

2. A portable reservoir having a flexible distributing-pipe connected thereto near the bottom, an arm pivoted to said reservoir near the top, and a bracket or support for said arm, the latter being provided at its outer end with a hook for grasping the distributing-pipe and holding its discharge end above the level of the liquid in the reservoir when the latter is not in use, substantially as described.

FRANCIS D. LOOMIS.
JOHN B. DUPONT.

Witneses:
W. N. MASON,
FREDERICK M. ESTY.